USU010162762B2

(12) United States Patent
Blake et al.

(10) Patent No.: US 10,162,762 B2
(45) Date of Patent: Dec. 25, 2018

(54) MANAGING MEMORY BASED ON HINT DATA GENERATED FROM MAPPING DATA ENTRIES

(71) Applicant: ARM LIMITED, Cambridge (GB)

(72) Inventors: Geoffrey Blake, Austin, TX (US); Ali Ghassan Saidi, Austin, TX (US); Mitchell Hayenga, Austin, TX (US)

(73) Assignee: ARM LIMITED, Cambridge (GB)

( * ) Notice: Subject to any disclaimer, the term of this patent is extended or adjusted under 35 U.S.C. 154(b) by 352 days.

(21) Appl. No.: 14/692,959

(22) Filed: Apr. 22, 2015

(65) Prior Publication Data

US 2016/0314078 A1    Oct. 27, 2016

(51) Int. Cl.
  *G06F 12/1027*    (2016.01)
(52) U.S. Cl.
  CPC .. *G06F 12/1027* (2013.01); *G06F 2212/1008* (2013.01); *G06F 2212/50* (2013.01); *G06F 2212/68* (2013.01); *Y02D 10/13* (2018.01)
(58) Field of Classification Search
  CPC ......... G06F 12/1027; G06F 2212/1008; G06F 2212/50; G06F 2212/68–2212/684
  USPC ....................................................... 711/206
  See application file for complete search history.

(56) References Cited

U.S. PATENT DOCUMENTS

| 7,581,064 B1 | 8/2009 | Zedlewski et al. | |
| 2009/0049272 A1* | 2/2009 | Brunheroto | G06F 12/121 711/207 |
| 2013/0031298 A1* | 1/2013 | Tan | G06F 12/0246 711/103 |
| 2013/0191605 A1* | 7/2013 | Solihin | G06F 12/0284 711/156 |
| 2014/0025923 A1 | 1/2014 | Klein | |
| 2014/0089608 A1 | 3/2014 | King | |

OTHER PUBLICATIONS

Lu, Y., Wu, D., He, B., Tang, X., Xu, J., Guo, M. "Rank-Aware Dynamic Migrations and Adaptive Demotions for DRAM Power Management", Article in Computing Research Repository, 2014.*
Cooper-Balis, E., Jacob, B., "Fine-Grained Activation for Power REduction in DRAM", Article in IEEE Micro, vol. 30, ISsue 3, May 2010, pp. 34-47.*
Pingali, K., "Cache coherence in shared-memory architectures", Lecture Notes retrieved from Department of Computer Science at the University of Texas at Austin, latest published version Jan. 10, 2008.*

(Continued)

*Primary Examiner* — Reginald G Bragdon
*Assistant Examiner* — Aaron D Ho
(74) *Attorney, Agent, or Firm* — Nixon & Vanderhye, P.C.

(57) ABSTRACT

A data processing system 4 includes a translation lookaside buffer 6 storing mapping data entries 10 indicative of virtual-to-physical address mappings for different regions of physical addresses. A hint generator 20 coupled to the translation lookaside buffer 6 generates hint data in dependence upon the storage of mapping data entries within the translation lookaside buffer 6. The hint generator 20 tracks the loading of mapping data entries and the eviction of mapping data entries from the translation lookaside buffer 6. The hint data is supplied to a memory controller 8 which controls how data corresponding to respective different regions of physical addresses is stored within a heterogeneous memory system, e.g. the power state of different portions of the memories storing different regions, which type of memory is used to store different regions.

18 Claims, 7 Drawing Sheets

(56) References Cited

OTHER PUBLICATIONS

Seong, B., Kim, D., Roh, Y., Park, K., Park, D., "TLB Update-Hint: A Scalable TLB Consistency Algorithm for Cache-Coherent Non-uniform Memory Access Multiprocessors." Article in IEICE Transactions on Information and Systems 87-D(7):1682-1692 Jul. 2004.*
UK Search and Examination Report dated Jul. 20, 2016 issued in GB 1602865.6, 7 pages.
M. Saxena et al, "FlashVM: Virtual Memory Management on Flash" *Proceedings of the 2010 USENIX annual technical conference*, Jun. 2010, 14 pages.
G. Dhiman et al, "PDRAM: A Hybrid PRAM and DRAM Main Memory System" ACM/IEEE Design Automation Conference *DAC '09*, Jul. 2009, 6 pages.
H. Li et al, "Energy-Aware Flash Memory Management in Virtual Memory System" *IEEE Transactions on Very Large Scale Integration (VLSI) Systems*, vol. 16, No. 8, Aug. 2008, pp. 952-964.
T. Kgil et al, Improving NAND Flash Based Disk Caches, 35th International Symposium on Computer Architecture, *ISCA* '08, Jun. 2008, pp. 327-338.
J.C. Mogul et al, "Operating System Support for NVM+DRAM Hybrid Main Memory" Proceedings of the 12th conference on Hot topics in operating systems, *HotOS'09*, May 2009, 5 pages.
Lenovo "eXFlash DDR3 Storage DIMMs" Lenovo Press Product Guide, Dec. 2014, pp. 1-10.
M. Gottscho, "ViPZonE: Exploiting DRAM Power Variability for Energy Savings in Linux x86-64" M.S. Project Report, NanoCAD Lab, UCLA Electrical Engineering, Mar. 2014, pp. 1-47.
X. Fan et al, "Memory Controller Policies for DRAM Power Management" Proceedings of the 2001 International Symposium on Low Power Electronics and Design, *ISLPED '01*, Aug. 2001, 6 pages.
V. Delaluz et al, "DRAM Energy Management Using Software and Hardware Directed Power Mode Control" *Proceedings of the 7th International Symposium on High-Performance Computer Architecture HPCA '01*, Jan. 2001, pp. 159-169.
I. Hur et al, "A Comprehensive Approach to DRAM Power Management" IEEE 14th International Symposium on High Performance Computer Architecture, *HPCA* 2008, Feb. 2008, 12 pages.
H. Huang et al, "Design and Implementation of Power-Aware Virtual Memory" ATEC '03 Proceedings of the USENIX Annual Conference, Jun. 2003, 14 pages.
B. Jacob et al, "The Memory System: You Can't Avoid It, You Can't Ignore It, You Can't Fake It" Jun. 2009, 77 pages.
B. Jacob et al, "Memory Systems: Cache, DRAM, Disk", Sep. 2007, 1017 pages.
Examination Report Under Section 18(3) in Application No. GB1602865.6 dated Jul. 10, 2017.

* cited by examiner

Mapping Data Entry

Hint Data

US 10,162,762 B2

MANAGING MEMORY BASED ON HINT DATA GENERATED FROM MAPPING DATA ENTRIES

BACKGROUND

Field

This disclosure relates to the field of data processing systems. More particularly, this disclosure relates to the control of memory systems.

Description

It is known to provide data processing systems which generate virtual addresses that are translated into physical addresses, with those physical addresses then being used to address the memory system. Within such systems it is known to provide a translation lookaside buffer (TLB) which stores recently used translation specifying data for performing such virtual-to-physical address translations in the likelihood that further translations will require the same translation specifying data and this can be supplied from the translation lookaside buffer rather than requiring a page table walk within a set of page tables describing the virtual-to-physical address mapping for the entire memory address space.

SUMMARY

Viewed from one aspect the present disclosure provides apparatus for processing data comprising:

mapping circuitry to store one or more mapping data entries respectively indicative of a mapping between a region of virtual addresses within a virtual address space and a region of physical addresses within a physical address space and to perform a mapping from a virtual address within said region of virtual addresses to a physical address within said region of physical addresses;

hint generating circuitry coupled to said mapping circuitry to generate hint data dependent upon storage of mapping data entries within said mapping circuitry; and storage control circuitry to control, in dependence upon said hint data, how data corresponding to respective different regions of physical addresses is stored within a memory system.

Viewed from another aspect the present disclosure invention provides apparatus for processing data comprising:

mapping means for storing one or more mapping data entries respectively indicative of a mapping between a region of virtual addresses within a virtual address space and a region of physical addresses within a physical address space and for performing a mapping from a virtual address within said region of virtual addresses to a physical address within said region of physical addresses;

hint generating means, coupled to said mapping means, for generating hint data dependent upon storage of mapping data entries within said mapping circuitry; and storage control means for controlling, in dependence upon said hint data, how data corresponding to respective different regions of physical addresses is stored within a memory system.

Viewed from a further aspect the present disclosure provides a method of processing data comprising:

storing one or more mapping data entries respectively indicative of a mapping between a region of virtual addresses within a virtual address space and a region of physical addresses within a physical address space performing mapping from a virtual address within said region of virtual addresses to a physical address within said region of physical addresses using at least one of said one or more mapping data entries;

generating hint data in dependence upon storage of mapping data entries; and controlling, in dependence upon said hint data, how data corresponding to respective different regions of physical addresses is stored within a memory system.

The above, and other objects, features and advantages of this disclosure will be apparent from the following detailed description of illustrative embodiments which is to be read in connection with the accompanying drawings.

DRAWINGS

FIG. 1 schematically illustrates a data processing system with a heterogeneous memory system and employing virtual-to-physical address translation;

FIG. 2 schematically illustrates a mapping data entry which may be stored within a translation lookaside buffer;

FIG. 3 schematically illustrates hint data which may be generated in dependence upon storage of mapping data entries;

Figure 9:
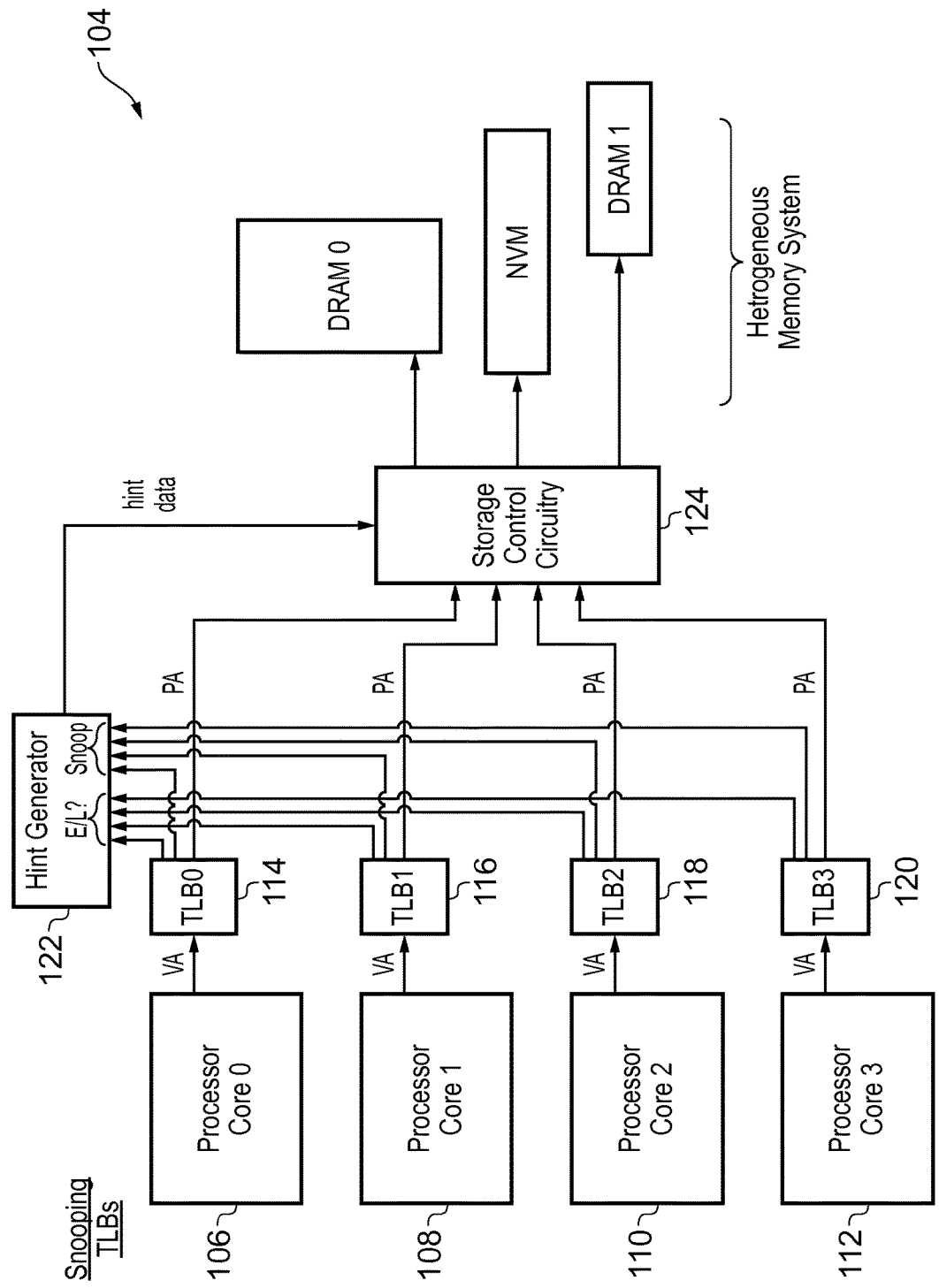
Figure 10:
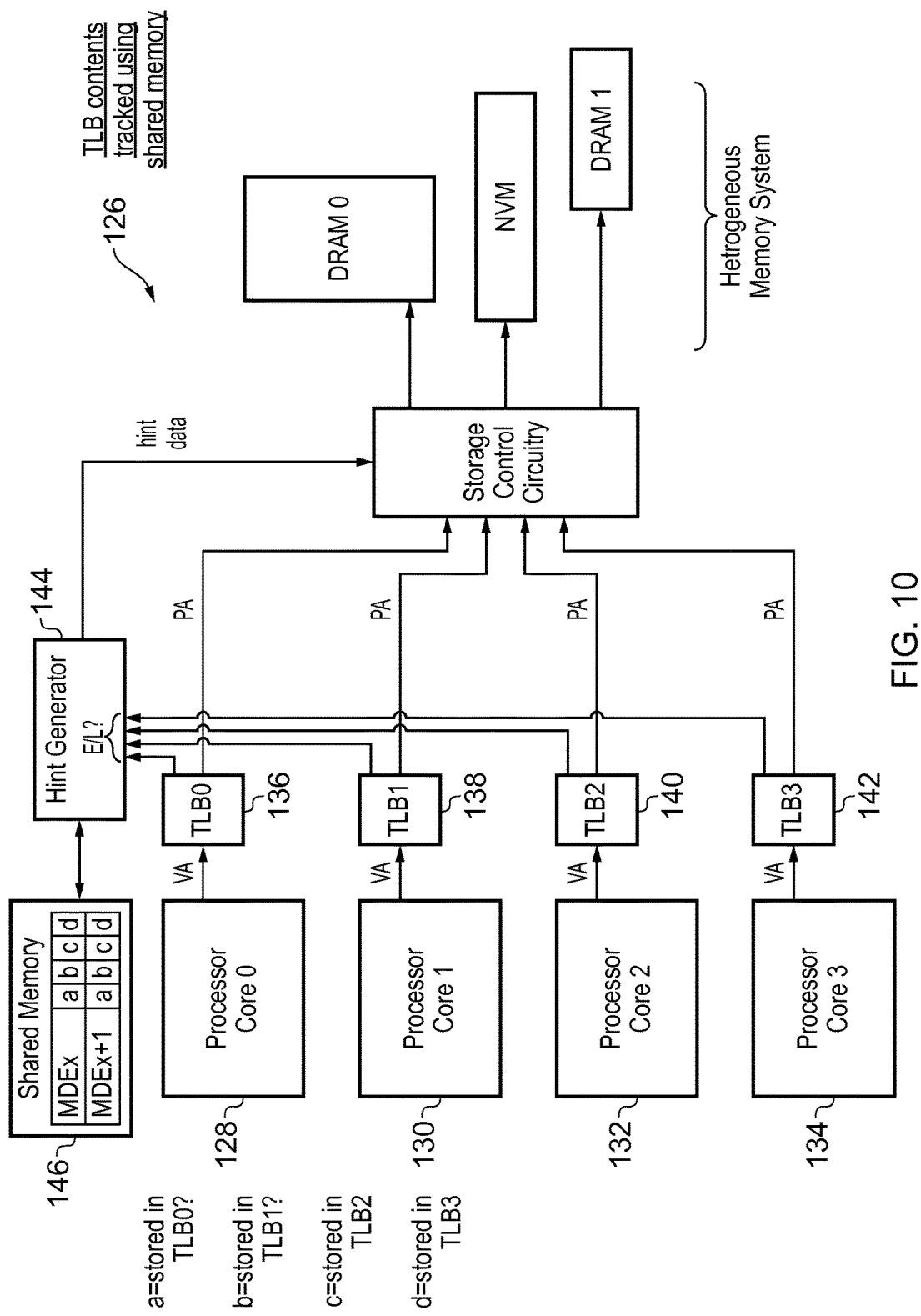

FIG. 9 schematically illustrates a data processing system in which a hint generator performs snoop requests upon multiple translation lookaside buffers; and FIG. 10 schematically illustrates a data processing system in which a hint generator uses a shared memory to track mapping data entries within multiple translation lookaside buffers.

EMBODIMENTS

Figure 1:
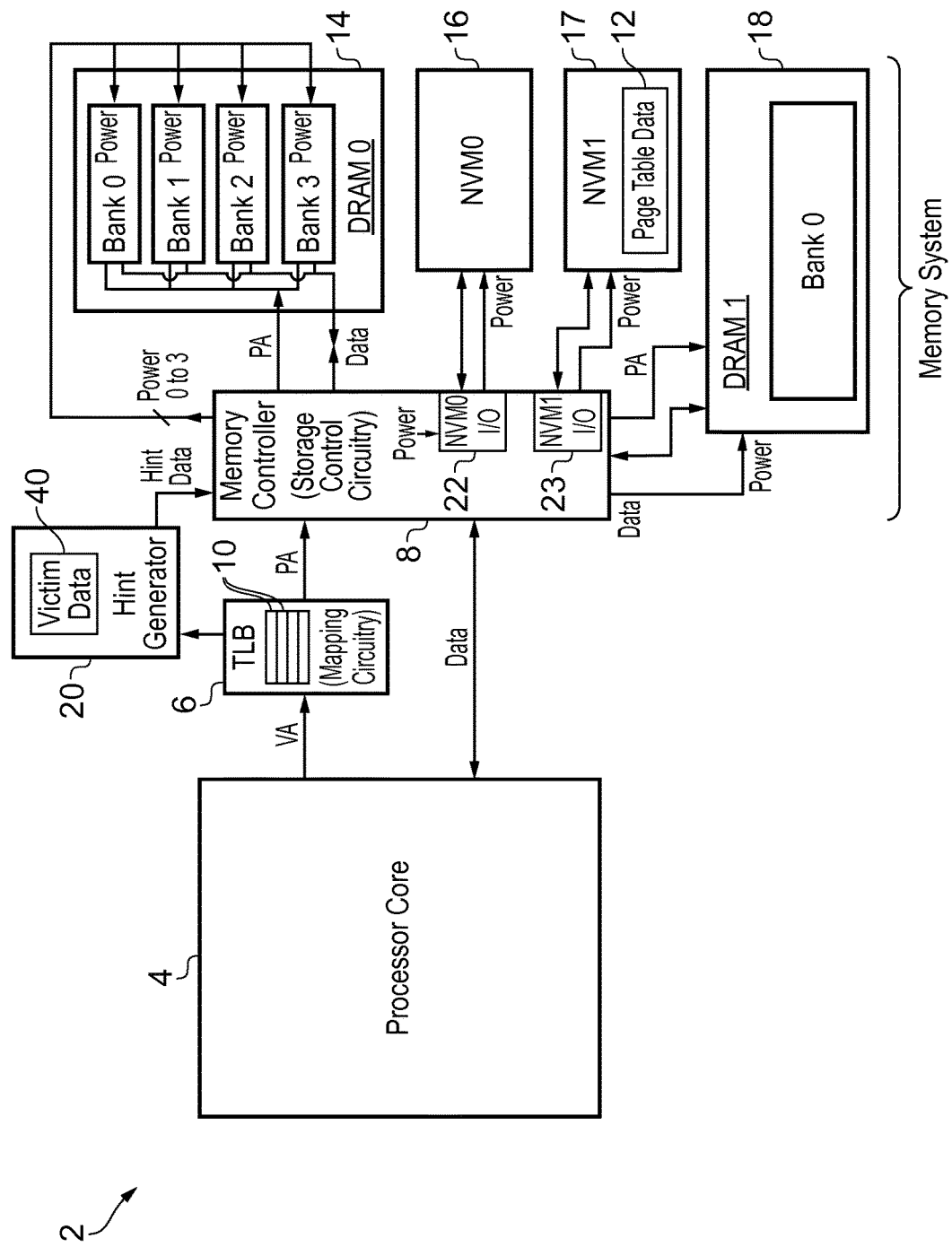

FIG. 1 schematically illustrates a data processing system 2 incorporating a processor core 4, which executes a stream of program instructions. Some of these program instructions may be load instructions or store instructions, which specify an address of data to be accessed using a virtual address (VA). This virtual address is supplied to a translation lookaside buffer 6, where it is subject to a virtual-to-physical address translation to generate a physical address (PA), which is then supplied to a memory controller 8. The translation lookaside buffer 6 stores a plurality of mapping data entries 10. The mapping data entries 10 are read from page table data 12 stored elsewhere in the system using a page table walk as will be familiar to those in this technical field. The page table data 12 describes the virtual-to-physical address mapping, and other memory attributes, associated with the entire memory address space. Individual mapping data entries 10 specify the virtual-to-physical address translation and memory attributes for memory pages which are regions of virtual addresses within a virtual address space (e.g. 4 kB pages) and regions of physical addresses within a physical address space, as well as other memory attributes, such as access permissions (read/write/executable), cacheability and other attributes of the page of memory concerned.

If a virtual address received by the translation lookaside buffer 6 does not have a corresponding mapping data entry 10 already stored within the translation lookaside buffer 6, then a page table walk through the page table data 12 is initiated to read the appropriate mapping data entry so that it may be stored within the translation lookaside buffer 6 for future use and is used for the memory access that triggered the loading of that mapping data entry into the translation lookaside buffer 6. The translation lookaside buffer 6 accordingly can be considered to cache a set of recently used mapping data entries read via page table walks through the full page table data 12. If there is insufficient storage space within the translation lookaside buffer 6 for a newly read mapping data entry, then a currently stored mapping data entry 10 will be evicted in order to make space available for the new entry. The translation lookaside buffer 6 is an example of a form of mapping circuitry which serves to store one or more mapping data entries respectively indicatively between a mapping of a region of virtual addresses within a virtual address space to a region of physical addresses within a physical address space.

The memory controller 8 serves as storage control circuitry which controls access to a heterogeneous memory system, which in this example embodiment includes a first DRAM memory (DRAM0) 14, a first non-volatile memory (NVM0) 16, a second non-volatile memory (NVM1) 17 and a second DRAM memory (DRAM1) 18. These different forms of memory have different performance characteristics, such as power consumption to store data energy consumption to store data, energy consumption to access data, power consumption to access data, access latency, volatility and wear rate. As an example, the first DRAM memory 14 may be highly volatile requiring regular refreshing and so have a relatively high power consumption to store data, but provide a lowest access latency when accessing data compared to other forms of memory. The DRAM memory 14 may also not be subject to wear effects. In contrast, the second DRAM memory 18 may have lower power consumption to store data, but a higher access latency than the first DRAM memory 14. The non-volatile memories 16, 17 may have lower power consumption to store data than either of the first and second DRAM memories 14, 18, but have higher access latency and may also be subject to wear effects whereby repeated writing of data to the memory will eventually result in failure of at least portions of the flash memory 16.

It will be seen that the different performance characteristics of the different components of the heterogeneous memory system have the effect that these different components are better suited for the storage of data of different types. For example, the first DRAM memory 14 may be well suited for the storage of data values to be manipulated whereby frequent low latency read and write accesses to those data values may be desirable and justify the power and/or energy cost associated with the DRAM memory 18. The second DRAM memory 18 may be suited to storage of a larger volume of less latency sensitive data. The non-volatile memory 16 may be well suited to the storage of constant parameters which may be read but not written. Energy savings and performance gains may be made if the memory controller 8 is able to utilize appropriate forms of memory to store data from regions of physical addresses so that the access characteristics and use of that data matches the performance characteristics of the portion of the heterogeneous memory system which is utilized to store that data.

Hint generator 20 coupled to the translation lookaside buffer 6 and the memory controller 8 serves to generate hint data which is dependent upon the storage of mapping data entries 10 within the translation lookaside buffer 6. This hint data is supplied to the memory controller 8 which uses that hint data to control how data corresponding to respective different regions of physical addresses is stored within the heterogeneous memory system including, in this example, the first and second DRAM memories 14, 18, and the non-volatile memory 16, 17. At a high level, one example of the use of the hint generator 20 and the hint data would be that if the hint generator 20 detects that a mapping data entry for a region of physical addresses has been evicted from the translation lookaside buffer 6, then it is likely that the victim selection algorithm used by the translation lookaside buffer 6 has identified that region of the physical addresses as being relatively infrequently accessed and accordingly the memory controller 8 can power down a bank of bit cells within the first DRAM memory 14 containing that region of memory as the saving and power will more than compensate for the increase in latency for accessing that data which will be incurred by the subsequent need to power up the bank of bit cells in order to gain access to that region of physical addresses. Furthermore, as the mapping data entry will have been evicted from the translation lookaside buffer 6, a relatively slow page table walk will be required in order to reload the mapping data entry necessary to access that data again and the time taken to perform this page table walk may be sufficient that the time taken to power up the bank of bit cells can be hidden as it will be less than the time taken for the page table walk to be completed. Another example of how the hint data may be used is that it may indicate to the memory controller 8 that a particular region of physical addresses is one best suited to storage within longer access latency, but lower energy consumption memory, such as the non-volatile memory 16 compared with the first or second DRAM memories 14, 18.

Also illustrated in FIG. 1 are access circuits 22, 23 which are respectively provided to control/coordinate data accesses to the first non-volatile memory 16 and the second non-volatile memory 17. If the hint data supplied to the memory controller 8 from the hint generator 20 indicates that no regions of physical addresses stored within a respective one of the first non-volatile memory 16 or the second non-volatile memory 17 are currently active (as indicated by the non-presence of any corresponding mapping data entry within the translation lookaside buffer 6), then power may be saved by powering down the appropriate access circuitry 22, 23. This may increase access latency, but the saving in energy may justify this increase.

Figure 2:
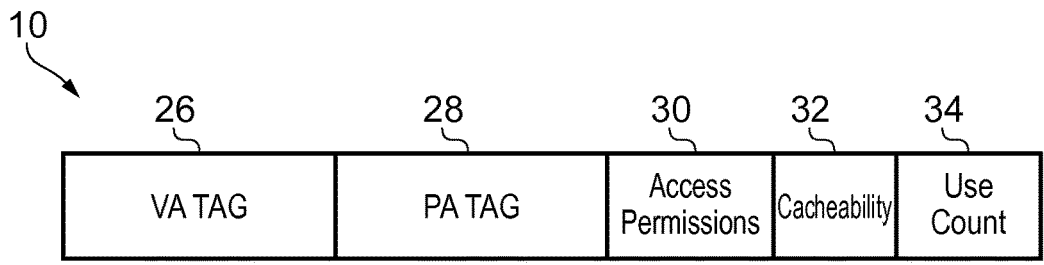

FIG. 2 schematically illustrates a mapping data entry 10. In this example the mapping data entry 10 includes a virtual TAG 26 and a physical TAG 28. The virtual TAG 26 and the physical TAG 28 are used to provide the virtual-to-physical address mapping. A received virtual address is compared with the virtual TAG 26 of the mapping data entries 10 stored within the translation lookaside buffer 6 to determine if an appropriate mapping data entry is present. If a hit arises, then the physical TAG 28 from the mapping data entry hit provides a translation for part of the received virtual address so that the appropriate physical address may be generated. The mapping data entry 10 also includes access permission data 30 (such as read permission, write permission, execute permission etc). A cacheability flag 32 may be used to indicate whether data from that region of memory may be stored within a cache of the processor core 4. It will be appreciated that the data processing system 2 may also include one or more cache memories (not shown—e.g. data cache, instruction cache, unified level 2 cache etc.) addressed with either physical virtual addresses or virtual addresses as they are downstream or in parallel of the translation lookaside buffer 6. The mapping data entry 10 includes a use count 34 used by the translation lookaside buffer 6 to track how frequently that mapping data entry 10 is used to perform virtual-to-physical address translation and accordingly assist in selecting an appropriate victim when eviction of a mapping data entry is required.

Figure 3:
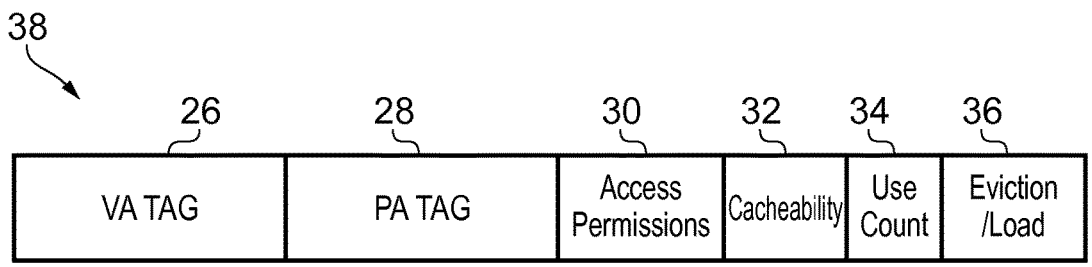

FIG. 3 schematically illustrates one example form of hint data 38 which may be generated by the hint generator 20 and supplied to the memory controller 8. This hint data 38 includes, in this example, all the fields of data within a mapping data entry 10, which has either been evicted from the translation lookaside buffer 6 or loaded to the translation lookaside buffer 6. In addition to these fields, the hint data 38 includes a flag 36 specifying whether the hint data concerns a mapping data entry that has been evicted from the translation lookaside buffer 6 or a mapping data entry that has been loaded to the translation lookaside buffer 6.

Accordingly, when the translation lookaside buffer 6 is not full, a translation lookaside buffer miss will result in the triggering of a page table walk and the loading of a new mapping data entry 10 together with the generation of hint data corresponding to that loaded mapping data entry 10 with the eviction/load flag 36 set to indicate that the hint data concerns a mapping data entry load. When a load of a mapping data entry 10 occurs and the translation lookaside buffer 6 is already full, a mapping data entry 10 already stored within the translation lookaside buffer 6 will be selected as a victim for replacement and, in addition to the hint data for the newly loaded mapping data entry 10, hint data relating to the evicted mapping data entry will be generated with the eviction/load flag 36 set to indicate that the hint data concerns a mapping data entry eviction.

In some example embodiments, a victim cache 40 within the hint generator 20 may serve to temporarily store hint data relating to mapping data entry evictions before such hint data is passed on to the memory controller 8, as will be described further below. The victim cache 40 may thus introduce a delay in, or potentially quash, notification of eviction of a mapping data entry to the memory controller 8 using hint data 38.

Figure 4:
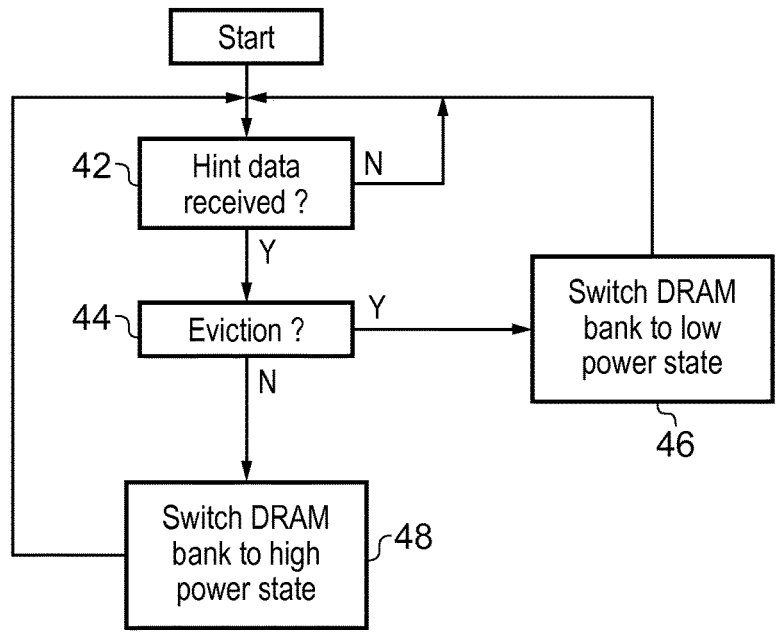
FIG. 4 is a flow diagram schematically illustrating DRAM bank power control in dependence upon received hint data.

FIG. 4 is a flow diagram schematically illustrating how the memory controller 8 may be used to perform power control for different banks of bit cells within a DRAM memory 14. The simple flow diagram of FIG. 4 assumes an example embodiment in which only DRAM memory 14 is present and that the size of the regions of physical addresses corresponds to the bank size of the bit cells within the DRAM memory 14. At step 42 processing waits until hint data is received. Step 44 then determines whether the hint data relates to a mapping data entry eviction. If the hint data does relate to a mapping data entry eviction, then step 46 serves to switch the DRAM bank storing the region of physical addresses for which the mapping data entry has been evicted from the translation lookaside buffer 6 into a low power state. If a determination at step 44 is that the hint data does not relate to an eviction, then it is assumed to relate to a load and accordingly processing passes to step 48 where the DRAM bank storing the region of physical addresses for which the mapping data entry has just been loaded into the translation lookaside buffer 6 is switched into a high power state. The DRAM memory 14 is formed of multiple banks of bit cells. Each bank has a variable operating parameter supplied to it in the form of the power signal which indicates whether that bank should be in its low power state (high latency, but low power consumption to store) or its high power state (low latency, but high power consumption to store).

Figure 5:
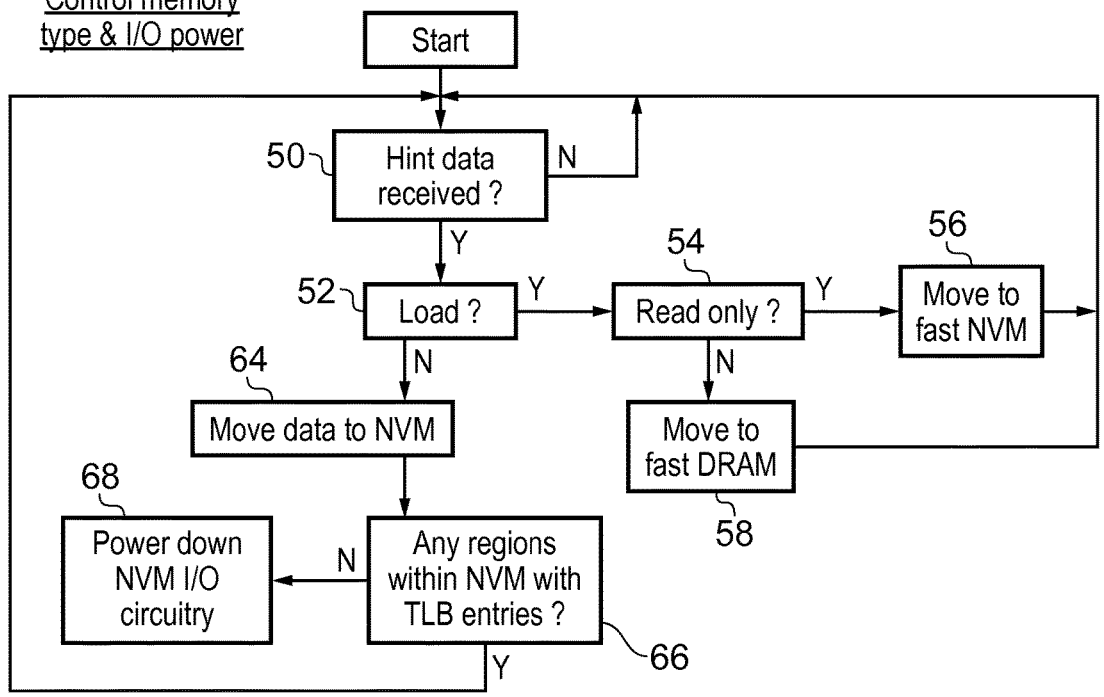
FIG. 5 is a flow diagram schematically illustrating control of memory type and access circuitry power in dependence upon received hint data.

FIG. 5 is a flow diagram schematically illustrating another form of control which may be performed by the memory controller 8 (storage control circuitry). In particular, the memory controller 8 may control what memory type is used for storing a particular region of physical addresses together with the power state of access circuitry for accessing different portions of the memory system.

At step 50 processing waits until hint data is received. Step 52 then determines whether the hint data specifies a mapping data entry which has been loaded into the translation lookaside buffer 6. If the hint data does concern a load, then processing proceeds to step 54 where a determination is made from the access permissions of the hint data whether the region of physical addresses is a read only region. If the access permissions indicate that the region of physical addresses for which the mapping data entry has been newly loaded into the translation lookaside buffer 6 is a read only region, then step 56 serves to move the data for the region of physical addresses concerned from slow second NVM memory 17 into the fast first NVM memory 16. The data may, for example, be data constants used in processing operations to be performed.

If the determination at step 54 is that the region of data is not read only, then processing proceeds to step 58 where the data is moved to the fast DRAM memory 14. This assumes that the region of physical addresses is storing data values which are, for example, operand values which will be frequently accessed for both reads and writes during the following processing.

It will be appreciated that the choices of where particular regions of physical addresses are to be stored (mapped by the memory controller 8) into the heterogeneous memory system may vary between different implementations and depending upon the priorities for that implementation. The above example is only given by way of illustration.

If the determination at step 52 is that the hint data does not relate to a mapping data entry load into the translation lookaside buffer 6, then it is assumed to relate to an eviction. Accordingly, processing passes to step 64 where the data for the region of physical addresses corresponding to the evicted mapping data entry is moved from its current location to the non-volatile memory 17. At step 66 a determination is made as to whether or not there are any regions of physical addresses mapped by the memory controller 8 to the first NVM memory 16 for which there are currently corresponding mapping data entries within the translation lookaside buffer. If there are no such regions, then step 68 serves to power down the access circuitry 22 for the first non-volatile memory 16. The access circuitry 22 may subsequently also power down the first non-volatile memory 16 itself. If the determination at step 66 is that there is at least one region of physical addresses mapped by the memory controller 8 to the flash memory 16 for which there currently is a mapping data entry 10 within the translation lookaside buffer 6, then step 68 is bypassed.

It will be understood that the control illustrated in FIG. 5 may be varied depending upon what components form the memory system and the performance characteristics of those components.

Figure 6:
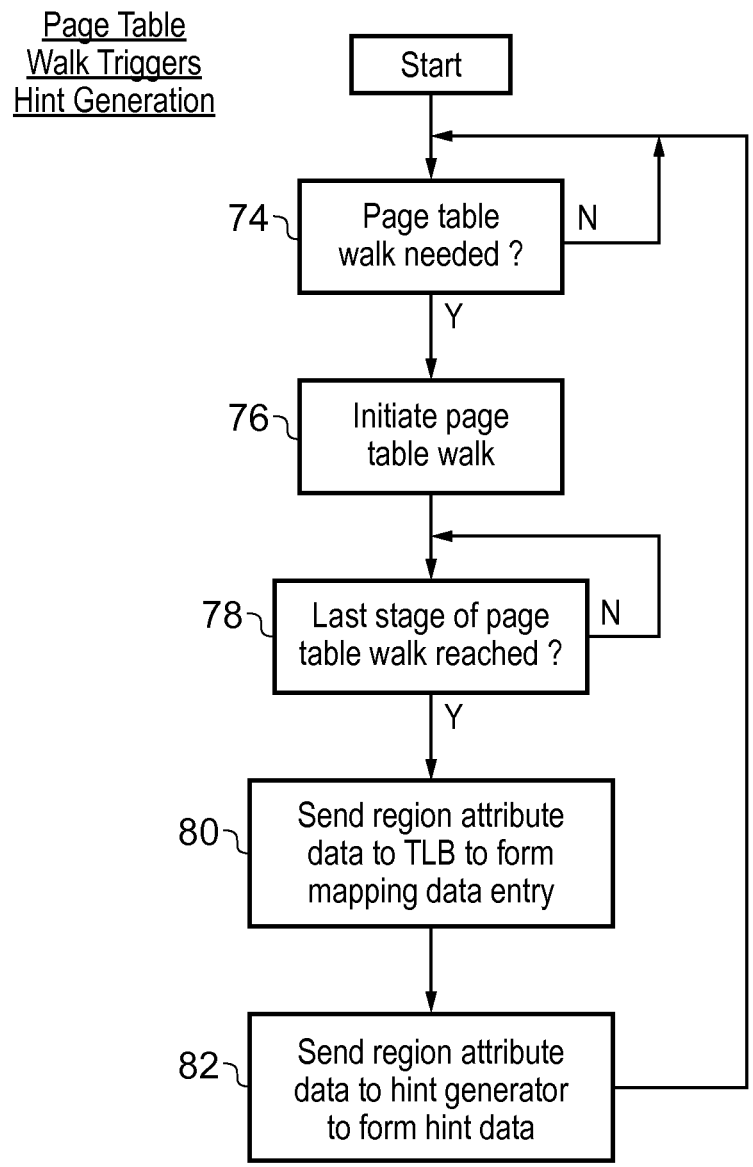
FIG. 6 is a flow diagram schematically illustrating how a page table walk may trigger hint generation.

FIG. 6 schematically illustrates a flow diagram of how a page table walk may be used to trigger hint generation. Step 74 determines whether a page table walk is necessary. A page table walk may be necessary due to a miss within the translation lookaside buffer 6 due to an appropriate mapping data entry not being available to perform the necessary virtual-to-physical translation upon a received virtual address. When a page table walk is necessary, then step 76 initiates the page table walk. Dedicated circuitry (not illustrated) may be used to perform such a page table walk in a manner familiar to those in this technical field. Step 78 then waits until the last stage of the page table walk is reached. The last stage of the page table walk is the one in which the virtual-to-physical address translation data is completed and the other attributes of the region of memory are read. When the last stage of the page table walk has been reached, step 80 serves to send the region attribute data (virtual-to-physical address mapping, access permissions, cacheability, etc.) to the translation lookaside buffer 6 to form a mapping data entry 10. Step 82 then sends this region attribute data to the hint generator 20 where it is used to form hint data 38 sent by the hint generator 20 to the memory controller 8.

Figure 7:
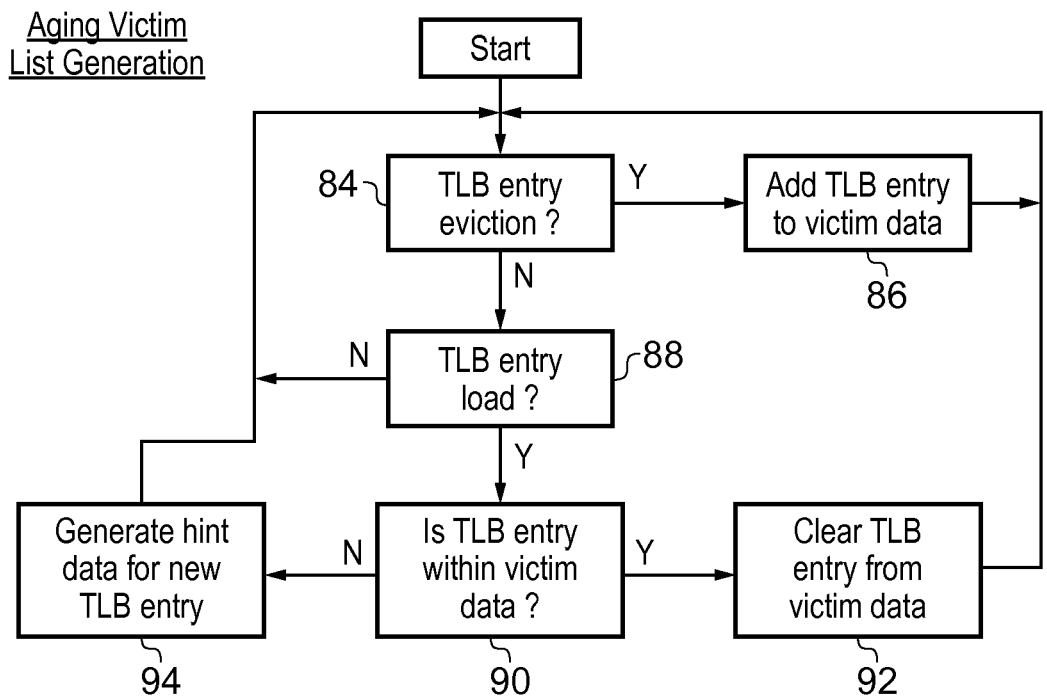
FIG. 7 is a flow diagram schematically illustrating generation of an aging victim list.

FIG. 7 is a flow diagram schematically illustrating generation of an aging victim list stored within the victim cache 40 that forms part of the hint generator 20. Step 84 determines whether there has been a mapping data entry eviction since step 84 was last executed. If there has been such an eviction, then step 86 serves to add the mapping data entry to the victim data stored within the victim cache 40. If the determination at step 84 is that there has been no mapping data entry eviction since the last execution of step 84, then processing proceeds to step 88 where a determination is made as to whether or not there has been a mapping data entry load since the last execution of step 88. If there has been no such mapping data entry load, then processing returns to step 84. If there has been such a mapping data entry load, then step 90 determines whether this mapping data entry load matches a mapping data entry stored within the victim cache, i.e. a mapping data entry which was recently evicted from the translation lookaside buffer 6. If there is such a match, then step 92 serves to clear the mapping data entry concerned from those stored within the victim cache 40 and processing returns to step 84. Thus a mapping data entry may be removed from the victim list before it has triggered generation of hint data if it is accessed again within a predetermined period. (In other embodiments the storage time for that entry could be reset by an access). If step 90 determines no such match, then the mapping data entry load is a load of new mapping data entry which has either not previously been stored within the translation lookaside buffer 6, or was evicted therefrom some time ago, and accordingly there is no corresponding entry within the victim data as will be described below in relation to FIG. 8. In this case, step 94 serves to generate hint data relating to the mapping data entry load. The action of step 90 can be seen to suppress the generation of hint data for mapping data entry loads when those mapping data entries are stored within the victim data and instead delete the mapping data entry stored within the victim data thereby suppressing generation of hint data relating to that victim when it ages to the appropriate point as discussed in relation to FIG. 8.

Figure 8:
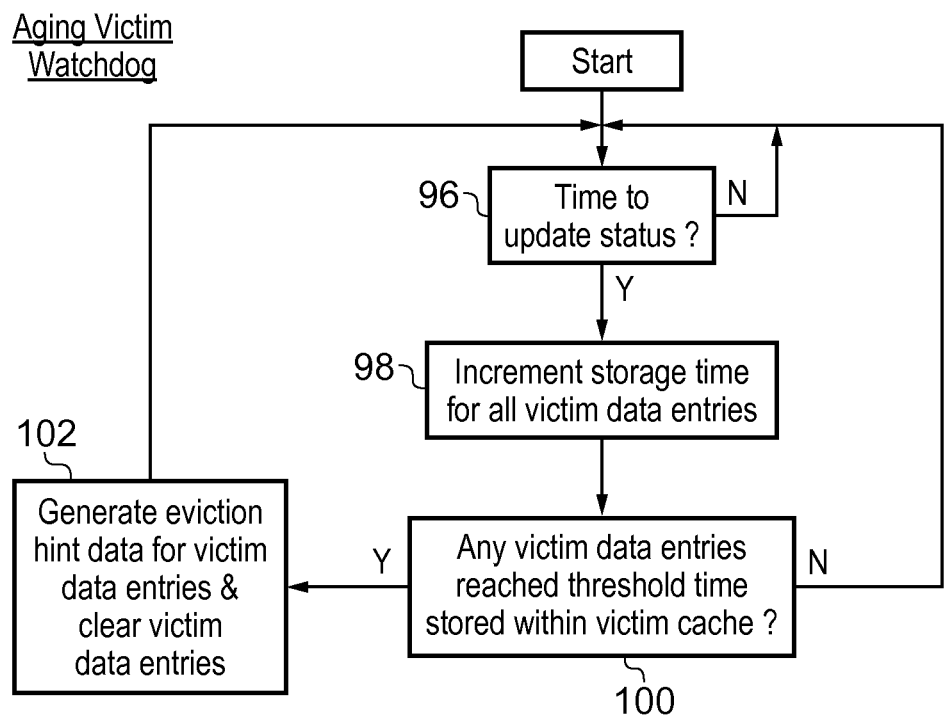
FIG. 8 is a flow diagram schematically illustrating the operation of an aging victim watchdog.

FIG. 8 is a flow diagram schematically illustrating an ageing victim watchdog generating hint data relating to mapping data entry evictions. Processing waits at step 96 until the watchdog time is reached at which the next updating of the victim data stored within the victim cache 40 in response to the watchdog is required. Step 98 serves to increment the storage time recorded for the respective victim data entries within the victim cache 40. Each entry within the victim cache is associated with data indicating how long that entry has been stored within the victim cache 40. Thus, as the entries within the victim cache 40, age the time noted for their storage within the victim cache will gradually increase.

At step 100 a determination is made as to whether any of the victim data entries in the victim cache 40 have reached a threshold time for which they have been stored within the victim cache 40. If there are no victim data entries that have reached this threshold, then processing returns to step 96 to await the next watchdog time. If there are any such entries, then step 102 serves to generate eviction hint data for those victim data entries and to clear those victim data entries from the victim cache 40. At an overall level, it will be seen that when a mapping data eviction occurs within the translation lookaside buffer 6, victim data giving details of that mapping data eviction is temporarily stored within the victim cache 40 and if that mapping data entry is not reloaded and the mapping data entry remains stored within the victim data cache for greater than a threshold period of time, then hint data will then be generated by the hint generator 20 and sent to the memory controller 8. This behavior serves to effectively damp the generation of hint data relating to evictions of mapping data entries from the translation lookaside buffer 6 to avoid inappropriate changes in how regions of physical data are stored which arise due to an eviction that is relatively rapidly followed by the mapping data entry being reloaded. Other embodiments are possible in which the generation of eviction hint data is undamped and no victim cache is provided or used with eviction hint data being sent to the memory controller as soon as the eviction occurs.

FIG. 9 illustrates another example embodiment of a data processing system 104. This data processing system 104 includes a plurality of processor cores 106, 108, 110, 112 each having a respective translation lookaside buffer 114, 116, 118, 120 for performing at least virtual-to-physical address translation. A hint generator 122 is coupled to the translation lookaside buffers 114, 116, 118, 120 and serves to generate hint data to be supplied to a storage controller 124 in dependence upon the storage of mapping data entries within the various translation lookaside buffers 114, 116, 118, 120. The storage controller 124 serves to control how data corresponding to different respective regions of physical addresses is stored within a heterogeneous memory system couple to the storage controller 124.

In this example embodiment, when a mapping data entry is evicted from one of the translation lookaside buffers 114, 116, 118, 120, this is notified by the translation lookaside buffer 114, 116, 118, 120 concerned to the hint generator 122. The hint generator 122 then generates a snoop request sent to the other of the translation lookaside buffers 114, 116, 118, 120, which did not send the eviction notification, to determine whether those other translation lookaside buffers 114, 116, 118, 120 contain a copy of the mapping data entry concerned. If the snoop responses returned indicate that any of the other translation lookaside buffers 114, 116, 118, 120 do contain the mapping data entry, then generation of hint data corresponding to the eviction which was notified is suppressed. Conversely, if the snoop responses indicate that none of the other translation lookaside buffers 114, 116, 118, 120 contain a copy of the mapping data entry for which notification of eviction has been received, then generation of hint data corresponding to that eviction is allowed to proceed and the hint data is supplied to the memory controller 124. The memory controller 124 can then control how data corresponding to the respective different regions of physical addresses is stored within the memory system in dependence upon that hint data as, for example, previously discussed.

FIG. 10 schematically illustrates a further example embodiment of a data processing system 126. In this embodiment, multiple processors 128, 130, 132, 134 are each provided with their own translation lookaside buffer 136, 138, 140, 142 to perform at least virtual-to-physical address translation. A hint generator 144 serves to receive notification of mapping data entry evictions and loads from the respective translation lookaside buffers 136, 138, 140, 142. The hint generator 144 has associated shared memory 146 in which it tracks all of the mapping data entries stored within any of the translation lookaside buffers 136, 38, 140, 142. Within the shared memory 146, each mapping data entry is identified and a flag bit associated therewith in respect of each of the translation lookaside buffers 136, 138, 140, 142 to indicate whether or not a copy of that mapping data entry is or is not stored within that respective translation lookaside buffer 136, 138, 140, 142.

When the hint generator 144 is notified of the eviction of a mapping data entry, then the hint generator 144 determines from the corresponding entry within the shared memory 146 whether or not following that eviction any of the other translation lookaside buffers 136, 138, 140, 142 are storing a copy of that mapping data entry and, if not, then hint data corresponding to that eviction is generated. If other copies of that mapping data entry are stored within other of the translation lookaside buffers 136, 138, 140, 142 as indicated by the data stored within the shared memory 146, then generation of the hint data corresponding to that eviction is suppressed. The hint generator 144 also tracks mapping data entry loads by setting the flags/entries within the shared memory 146.

It will be seen from the above that there are various different possible ways in which control of how data corresponding to a respective different regions of physical addresses is stored within a memory system may be achieved using hint data indicative of storage of mapping data entries within the mapping circuitry. The storage control circuitry may serve to control, for example, which portions of a heterogeneous memory system are powered or unpowered at a given time and/or where different regions of physical addresses are mapped within that heterogeneous memory system so as to match the performance characteristics of the portion of the heterogeneous memory system used to the characteristics of the use of that region as can be determined from the storage of corresponding mapping data entries within the mapping circuitry.

The hint data may take a variety of different forms. The hint data may indicate when a mapping data entry has been removed from the mapping circuitry, when a mapping data entry has been stored within the mapping circuitry, or indicate which mapping data entries are stored within the mapping circuitry, such as by tracking all loads and evictions, or by periodically supplying data indicating the full content of the mapping data entries within the mapping circuitry at a given point in time.

In the previous examples, the mapping circuitry has taken the form of a translation lookaside buffer. It is also possible that different forms of mapping circuitry may be used.

In the above described example embodiments, the mapping data entries have been read from page table data accessed using a page table data walk. Other embodiments are also possible where the mapping data may be derived in other ways, such as data stored within configuration registers or the like.

The various techniques described above in relation to the way in which control of how data corresponding to respective different regions of physical addresses may be performed are only examples and these and other techniques may be utilized in accordance with the teaching herein in different combinations and sub-combinations as appropriate for a particular implementation of the present techniques.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   mapping circuitry to store one or more mapping data entries respectively indicative of a mapping between a region of virtual addresses within a virtual address space and a region of physical addresses within a physical address space and to perform a mapping from a virtual address within said region of virtual addresses to a physical address within said region of physical addresses;
   hint generating circuitry coupled to said mapping circuitry to generate hint data indicating mapping data entries that have been loaded into the mapping circuitry and mapping data entries that have been evicted from the mapping circuitry; and
   storage control circuitry to control, in dependence upon said hint data, how data corresponding to respective different regions of physical addresses is stored within a memory system.

2. Apparatus as claimed in claim 1, wherein said hint data indicates which mapping data entries are stored in said mapping circuitry.

3. Apparatus as claimed in claim 1, wherein said hint data specifies one or more of:
   at least one region of physical addresses;
   at least one region of virtual addresses;
   access permission data;
   cacheability specifying data; and
   a count value indicative of how many times a mapping data entry has been used to map from a virtual address to a physical address while stored in said mapping circuitry.

4. Apparatus as claimed in claim 1, wherein said control of how data is stored specifies a value of a variable operating parameter of at least one region within said memory system.

5. Apparatus as claimed in claim 4, wherein said variable parameter is a power state of said at least one region.

6. Apparatus as claimed in claim 5, wherein:
   when said hint data indicates a mapping data entry has been removed from said mapping circuitry, said storage control circuitry switches a region of said memory system storing data mapped by said mapping data entry to a first power state; and
   when said hint data indicates said mapping data entry has been stored into said mapping circuitry, said storage control circuitry switches said region of said memory system storing data mapped by said mapping data entry to a second power state, said second power state having a higher power consumption than said first power state.

7. Apparatus as claimed in claim 1, wherein said control of how data is stored specifies which of a plurality of different regions within said memory system, and having different performance characteristics, is used to store data corresponding to a given region of physical addresses.

8. Apparatus as claimed in claim 7, wherein said different performance characteristics include one or more of:
power consumption to store data;
energy consumption to store data;
power consumption to access data;
energy consumption to access data;
access latency;
volatility; and
wear rate.

9. Apparatus as claimed in claim 1, wherein said memory system comprises a plurality of access circuits to access data stored within respective different portions of said memory system and said control of how data is stored controls which of said plurality of access circuits are in a first power state and which of said plurality of access circuits are in a second power state, said first power state having a higher power consumption than said second power state.

10. Apparatus as claimed in claim 1, wherein said mapping circuitry comprises a translation lookaside buffer.

11. Apparatus as claimed in claim 10, wherein said mapping data entry is specified by page table data accessed with a page table walk.

12. Apparatus as claimed in claim 11, wherein upon reaching a predetermined stage within said page table walk as part of storing a mapping data entry to said mapping circuitry, said hint generating circuitry generates hint data corresponding to said mapping data entry.

13. Apparatus as claimed in claim 1, wherein said hint generating circuitry comprises a victim cache to store victim data identifying mapping data entries evicted from said mapping circuitry.

14. Apparatus as claimed in claim 13, wherein said victim data indicates a given mapping data entry evicted from said mapping circuitry, and, if a memory access mapped by said given mapping data entry has not occurred for greater than a threshold time, then hint data corresponding to said given mapping data entry is generated.

15. Apparatus as claimed in claim 1, comprising a plurality of processors to execute respective streams of program instruction and each having an instance of mapping circuitry storing one or more mapping data entries, wherein, upon removing a mapping data entry from an instance of said mapping circuitry, one or more snoop requests are sent to other instances of said mapping circuitry to determine if none of said instances of mapping circuitry are storing said mapping data entry and generate hint data if none of said instances of mapping circuitry are storing said mapping data entry.

16. Apparatus as claimed in claim 1, comprising a plurality of processors to execute respective streams of program instruction, and each having an instance of mapping circuitry storing one or more mapping data entries, and a shared memory storing data indicative of which of said instances of mapping circuitry is storing which mapping data entries, wherein upon removing a mapping data entry from an instance of said mapping circuitry, if said shared memory indicates that none of said instances of mapping circuitry are storing said mapping data entry, then generating hint data.

17. Apparatus for processing data comprising:
mapping means for storing one or more mapping data entries respectively indicative of a mapping between a region of virtual addresses within a virtual address space and a region of physical addresses within a physical address space and for performing a mapping from a virtual address within said region of virtual addresses to a physical address within said region of physical addresses;
hint generating means, coupled to said mapping means, for generating hint data indicating mapping data entries that have been loaded into the mapping means and mapping data entries that have been evicted from the mapping means; and
storage control means for controlling, in dependence upon said hint data, how data corresponding to respective different regions of physical addresses is stored within a memory system.

18. A method of processing data comprising:
storing one or more mapping data entries respectively indicative of a mapping between a region of virtual addresses within a virtual address space and a region of physical addresses within a physical address space
performing mapping from a virtual address within said region of virtual addresses to a physical address within said region of physical addresses using at least one of said one or more mapping data entries;
generating hint data indicating mapping data entries that have been loaded into the mapping circuitry and mapping data entries that have been evicted from the mapping circuitry; and
controlling, in dependence upon said hint data, how data corresponding to respective different regions of physical addresses is stored within a memory system.

* * * * *